Dec. 25, 1928. Re. 17,174

A. N. ARMSTRONG

STRIKER ATTACHMENT FOR ANIMAL TRAPS

Original Filed Dec. 10, 1926

WITNESS
J. Illains

INVENTOR
Arthur N. Armstrong
BY
Denison Thompson
ATTORNEYS

Reissued Dec. 25, 1928.

Re. 17,174

UNITED STATES PATENT OFFICE.

ARTHUR N. ARMSTRONG, OF NORWICH, NEW YORK, ASSIGNOR OF ONE-HALF TO HERMAN J. SOMMERS, OF NORWICH, NEW YORK.

STRIKER ATTACHMENT FOR ANIMAL TRAPS.

Original No. 1,678,898, dated July 31, 1928, Serial No. 153,894, filed December 10, 1926. Application for reissue filed September 12, 1928. Serial No. 305,546.

This invention relates to a striker attachment for animal traps as distinguished from the permanent inclusion of the striker as part of the animal trap construction.

The main object is to provide a simple, practical and convenient striking device which may be easily and quickly attached to or removed from the frame of any twin jaw animal trap without in any way disturbing any of the parts of the trap thereby increasing the range of usefulness of the same trap for animals of different sizes or species and avoiding the expense and necessity for purchasing and setting different types of traps.

One of the specific objects is to provide the attachment with means whereby it may be automatically locked in place upon the frame of the trap by the simple operation of slidably engaging the attachment with said frame.

A further object is to provide the attachment with means adapted to cooperate with one of the jaws of the trap when the attachment is placed upon the frame to hold the spring actuated striker against the action of its spring.

Other objects and uses relating to specific parts of the attachment will be brought out in the following description.

In the drawings:—

Figure 1:
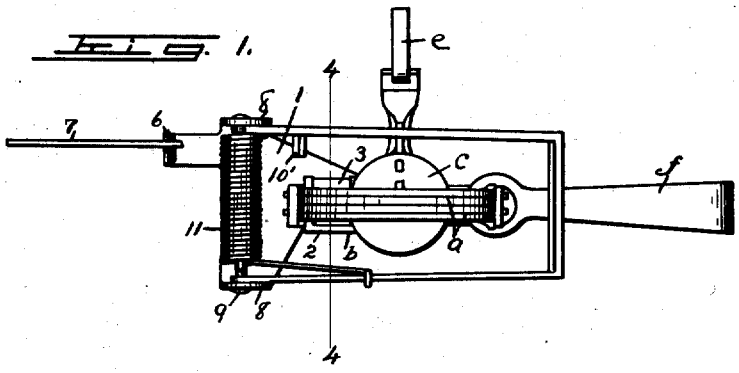
Figure 1 is a top plan of a twin jaw animal trap with the striker attachment in operative position thereon, the jaws being closed and the striker being shown in its striking position.

In order that the invention may be clearly understood I have shown an ordinary twin jaw trap having its jaws as —*a*— pivotally mounted upon the upturned ends of the frame bar —*b*— adapted to be held in their open positions by a platform —*c*— and a detent —*e*— against the action of the V-shaped leaf spring —*f*—.

The striker attachment comprises a plate —1— having one end provided with a loop —2— which is open at one side to permit the passage of a portion of the frame bar —*b*— therethrough or rather to permit the loop to be placed over and upon the frame bar —*b*— by a lateral sliding movement so that the opposite sides of the loop will engage corresponding faces of the frame bar to hold said frame bar and plate against relative vertical movement.

A spring leaf latch —3— is secured by a rivet —4— or equivalent fastening means to the upper side of the loop —2— and has its free end provided with a downwardly projecting shoulder —5— a distance from the closed side of the loop corresponding approximately to the width of the frame bar —*b*—, the front edge of the shoulder —5— being beveled to permit it to ride over and upon the top face of said frame bar.

The depth of the shoulder —5— is sufficient to extend across the adjacent edge of the frame bar —*b*— to cooperate with the closed side of the loop to hold the frame bar and attachment against relative lateral movement.

The loop —2— of the attachment is adapted to be placed upon the frame bar —*b*— between the center cross bar as —*b'*— and one of the upturned ends of the bar —*b*— opposite the leaf spring —*f*—, the length of said loop being sufficient to prevent undue displacement of the attachment lengthwise of the bar —*b*— as limited by the cross bar —*b'*— and the upturned end adjacent the attachment.

In placing the attachment upon the frame bar the loop is simply drawn laterally across the frame bar during which the beveled front face of the shoulder —5— rides across the upper face of the frame bar and when registered with the opposite edge of the bar automatically springs into place across the open side of the loop and against the adjacent edge of the bar.

In removing the attachment it is simply necessary to spring the latch upwardly out of engagement with the adjacent end of the bar —*b*— and then to slide the loop laterally from the bar.

The other end of the plate —1— extends some distance beyond the loop —2— and adjacent end of the frame bar —*b*— and is provided with an upturned apertured end —6— to which is pivoted one end of a detent —7— having its other end adapted to be moved to a position directly over the loop —2— for engagement with the lower face of one of the jaws —*a*— when said jaws are opened or set.

The intermediate portion of the plate —1— is provided with upturned apertured ears —8— carrying a pivotal bolt or pin —9— upon which is mounted the ends of a U-shaped striker bar of sufficient length to extend beyond the jaws —*a*— and to engage the upper leaf of the spring —*f*— when released and actuated by its operating spring —11—.

In other words, the striker bar —10— is pivoted to the plate —1— to swing about an axis at right angles to the axes of the jaws —*a*— or from a position at one end of the frame bar —*b*— to a closed position at the opposite end of said bar and across the loop —2— and is provided with a laterally projecting lug —10′— which, when the striker is opened assumes a position between the pivot —9— and fulcrum as —7′— of the detent —7— and adapted to be engaged by said detent to hold the striker in its open position against the action of the spring —11—.

Figure 2:
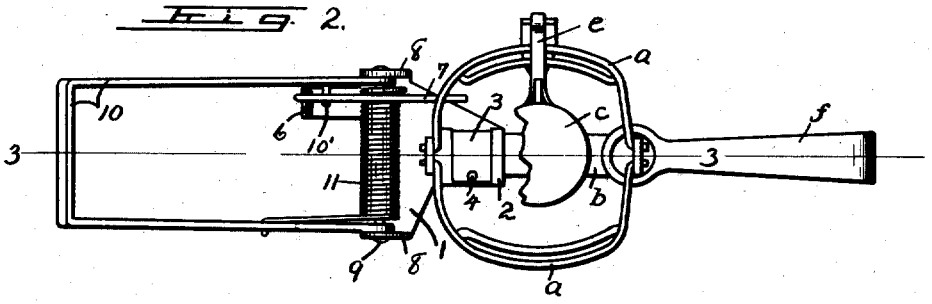
Figure 2 is a top plan, partly broken away of the same trap, and striker attachment with the jaws and striker in their open positions.

This spring —11— is coiled around the pivotal pin —9— and has one end engaged with the plate —1— and its other end engaged with one of the arms of the U-shaped striker bar —10— as shown in Figure 2 some distance from the pivotal pin —9—.

Figure 3:
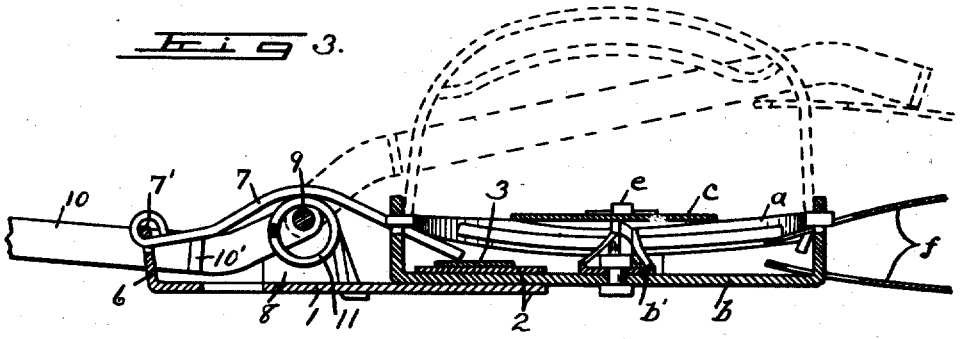
Figure 3 is an enlarged longitudinal sectional view taken on line 3—3, Figure 2.
Figure 4:
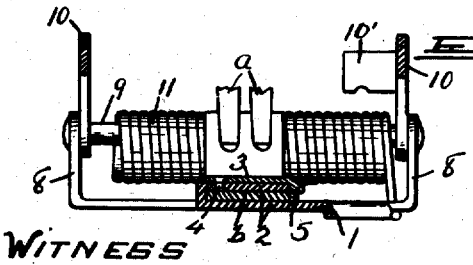
Figure 4 is an enlarged transverse sectional view taken on line 4—4, Figure 1.

The striker bar —10— is adapted to be opened by hand against the action of its operating spring —11— wholly at one end of the trap frame when the plate —1— is attached to said frame and is held in its open position by the detent —7— which engages the upper face of the lug —10′— as shown in Figure 3 and has its free end of sufficient length to extend over the loop —2— and under one of the jaws —*a*— when the latter are locked in their open positions.

Under these conditions the closing action of the striker bar —10— is controlled by the closing action of the jaws so that when the jaws of the trap are released the detent —7— will also be released to permit the operation of the striker bar by its operating spring —11— thereby causing the striker bar to straddle the closed jaws —*a*— and to extend sufficient distance beyond the same to engage the upper leaf of the jaw actuating spring —*f*— which serves to limit the closing movement of said striker bar as indicated by dotted lines in Figure 3.

Although I have shown and described a particular construction for carrying out the objects stated it is evident that various changes may be made therein without departing from the spirit of the invention.

What I claim is:

1. A striker attachment for animal traps of the twin jaw type, comprising a plate having at one end a loop open at one side for receiving a portion of the trap frame, movable means on the loop for locking it immovably to said frame, a spring-actuated striker pivoted to the plate, and means on the plate adapted to be controlled by one of the trap jaws for holding the striker against the action of its spring.

2. A striker attachment for animal traps as in claim 1 in which the locking means includes a latch movable to and from a position across the open side of the loop.

3. A striker attachment for animal traps as in claim 1 in which the holding means for the striker includes a detent pivoted to the plate and engaging the striker between both pivots.

4. A striker attachment for animal traps comprising a plate having a loop open at one side for receiving a portion of the trap frame, a latch on the plate for immovably locking the loop to said frame bar, a striker hinged to the plate to swing across the loop, a spring mounted on the plate for operating the striker, and means on the plate for holding the striker against the action of the spring.

5. A striker attachment for animal traps comprising a frame having a loop open at one side for receiving a portion of a trap frame, a latch member mounted on the attachment frame and movable to and from a position across the open side of the loop for locking the trap frame in the loop, and a striker hinged to the attachment frame.

6. A striker attachment for animal traps comprising a frame having a loop open at one side for receiving a portion of a trap frame, a latch member mounted on the attachment frame and movable to and from a position across the open side of the loop for locking the trap frame in the loop, a striker hinged to the attachment frame, and spring means normally tending to move the striker to a position over a portion of a trap when the latter has been assembled with the attachment.

7. A striker attachment for animal traps of the spring tension jaw type comprising an attachment frame having a recess for receiving a portion of a trap frame, means secured to the attachment frame and movable toward and from the said recess for engaging a trap frame to maintain the latter in said recess, and a striker hinged to the attachment frame.

8. A striker attachment for animal traps of the spring tension jaw type comprising an attachment frame having a recess for receiving a portion of a trap frame, a member secured to the attachment frame and adapted to overlie the open side of said recess to maintain a portion of the trap frame in said recess, said member being movable from its position overlying the recess to permit removal of a trap frame from the recess.

9. A striker attachment for animal traps of the spring tension jaw type comprising an attachment frame having a recess for receiving a portion of a trap frame, a member mounted on the attachment frame and adapted to engage a trap frame to maintain the latter in said recess, said member being capable of movement to release its engagement with the trap frame to permit the removal of the latter from the recess.

10. A striker attachment for animal traps comprising an attachment plate having a loop open at one side for receiving a portion of the trap frame, a latch on the attachment plate for immovably locking the loop to said frame, a striker hinged to the plate to swing across the loop, a spring mounted on the plate for operating the striker, and means on the striker co-acting with means on the plate for holding the striker against the action of the spring.

In witness whereof I have hereunto set my hand this 4th day of September, 1928.

ARTHUR N. ARMSTRONG.